US012663388B2

(12) United States Patent
Wang et al.

(10) Patent No.: US 12,663,388 B2
(45) Date of Patent: Jun. 23, 2026

(54) INSPECTION SYSTEM AND METHOD

(71) Applicant: NUCTECH COMPANY LIMITED, Beijing (CN)

(72) Inventors: Weizhen Wang, Beijing (CN); Bicheng Liu, Beijing (CN); Chunguang Zong, Beijing (CN); Shangmin Sun, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 336 days.

(21) Appl. No.: 18/575,301

(22) PCT Filed: Jul. 1, 2022

(86) PCT No.: PCT/CN2022/103281
§ 371 (c)(1),
(2) Date: Dec. 29, 2023

(87) PCT Pub. No.: WO2023/280062
PCT Pub. Date: Jan. 12, 2023

(65) Prior Publication Data
US 2024/0302299 A1 Sep. 12, 2024

(30) Foreign Application Priority Data
Jul. 9, 2021 (CN) .......................... 202110777668.7

(51) Int. Cl.
*G01N 23/083* (2018.01)
*G01N 23/04* (2018.01)
*H01J 25/50* (2006.01)

(52) U.S. Cl.
CPC ........... *G01N 23/083* (2013.01); *G01N 23/04* (2013.01); *G01N 2223/20* (2013.01); *H01J 25/50* (2013.01)

(58) Field of Classification Search
CPC .. G01N 23/083; G01N 23/04; G01N 2223/20; H01J 25/50; G01V 5/224
See application file for complete search history.

(56) References Cited

U.S. PATENT DOCUMENTS

| | | | |
|---|---|---|---|
| 2015/0325401 A1 | 11/2015 | Langeveld et al. | |
| 2018/0270941 A1 | 9/2018 | Nighan, Jr. et al. | |
| 2024/0319114 A1* | 9/2024 | Wang ..................... | G01V 5/224 |

FOREIGN PATENT DOCUMENTS

| | | |
|---|---|---|
| CN | 1144039 C | 3/2004 |
| CN | 1995993 A | 7/2007 |

(Continued)

OTHER PUBLICATIONS

ISR received in PCT/CN2022/103281; mailed Oct. 10, 2022.

(Continued)

*Primary Examiner* — Courtney D Thomas
(74) *Attorney, Agent, or Firm* — Kilpatrick Townsend & Stockton LLP

(57) ABSTRACT

An inspection system comprises: a radiation source; a detector configured to detect a signal when radiation emitted by the radiation source acts on the inspected object; and a processor in communication connection with the radiation source and configured to determine at least one periodic radiation combination corresponding to a type of the object according to the type of the object, select periodic radiation combinations respectively corresponding to at least two different portions of the object in the at least one periodic radiation combination, and cause the radiation source to emit radiation to the at least two corresponding different portions in selected periodic radiation combinations during the time that the object is scanned, wherein a periodic radiation combination is a chronological arrangement of at least one radiation pulse output by the radiation source in (Continued)

each scanning period. An inspection method is also pro-
vided.

19 Claims, 8 Drawing Sheets

(56)                References Cited

FOREIGN PATENT DOCUMENTS

| CN | 101162209 | B | 8/2010 |
|----|-----------|---|--------|
| CN | 102105815 | A | 6/2011 |
| CN | 101470084 | B | 12/2011 |
| CN | 203416494 | U | 1/2014 |
| CN | 104374785 | A | 2/2015 |
| CN | 104391339 | A | 3/2015 |
| CN | 103226114 | B | 9/2015 |
| CN | 105333826 | A | 2/2016 |
| CN | 106659448 | A | 5/2017 |
| CN | 113238293 | A | 8/2021 |
| CN | 113238297 | A | 8/2021 |
| CN | 113238298 | A | 8/2021 |
| CN | 113281821 | A | 8/2021 |
| CN | 113329552 | A | 8/2021 |
| WO | 2016164411 | A1 | 10/2016 |

OTHER PUBLICATIONS

Written Opinion of the ISA received in PCT/CN2022/103281;
mailed Oct. 10, 2022.
First OA received in CN Application No. 202110777668.7; mailed
Aug. 17, 2021.
Second OA received in CN Application No. 202110777668.7;
mailed Sep. 15, 2021.
Grant Notice received in CN Application No. 202110777668.7;
mailed Oct. 9, 2021.
The Extended European Search Report issued in European corre-
sponding application No. 22836813.0 mailed on May 19, 2025, 9
pages.

* cited by examiner

INSPECTION SYSTEM AND METHOD

CROSS-REFERENCES TO RELATED APPLICATIONS

The present disclosure is a national phase application of International Application No. PCT/CN2022/103281, filed on Jul. 1, 2022, which claims priority to Chinese Application No. 202110777668.7, filed on Jul. 9, 2021, the entireties of which are herein incorporated by reference.

FIELD

The present disclosure relates to the field of radiation inspection, in particular to an inspection system and method.

BACKGROUND

In some related technologies, a container inspection system and a vehicle inspection system respectively aim at different types of inspected objects, and are equipped with specific ray sources. For example, the container inspection system adopts a ray source having a higher ray energy, while the vehicle inspection system for passenger vehicles adopts a ray source having a lower ray energy. In some other related technologies, the inspection system has two different ray sources. When a vehicle is inspected, different parts of the vehicle are recognized, and different ray sources are selected for the different parts.

SUMMARY

The inventor found through researches that in related technologies, an inspection system equipped with a specific ray source has poor adaptability for an inspected object, while the inspection system equipped with two different ray sources has larger total weight and higher cost.

In view of this, embodiments of the present disclosure provide an inspection system and method capable of improving adaptability.

One aspect of the present disclosure provides an inspection system, including: a radiation source; a detector configured to detect a signal when radiation emitted by the radiation source acts on the inspected object; and a processor in communication connection with the radiation source and configured to determine at least one periodic radiation combination corresponding to a type of the object according to the type of the object, select periodic radiation combinations respectively corresponding to at least two different portions of the object in the at least one periodic radiation combination, and cause the radiation source to emit radiation to the at least two corresponding different portions in selected periodic radiation combinations during the time that the object is scanned, wherein a periodic radiation combination is a chronological arrangement of at least one radiation pulse output by the radiation source in each scanning period.

In some embodiments, the at least two different portions are not overlapped in space, have different acceptable radiation doses, or have different mass thicknesses.

In some embodiments, the processor is configured to determine an inspection mode of the object, and selection is also made according to the inspection mode of the object while selecting the periodic radiation combinations respectively corresponding to the at least two different portions of the object.

In some embodiments, the object is a vehicle, and the processor is configured to cause periodic radiation combinations respectively corresponding to at least two different vehicle body portions of the object to be a periodic radiation combination with the highest total energy in the at least one periodic radiation combination corresponding to the type of the object when the inspection mode of the object is a mode in which no person stays in the vehicle.

In some embodiments, the object is a vehicle, the processor is configured to cause a periodic radiation combination corresponding to a portion with a person in the at least two different vehicle body portions of the object to be a periodic radiation combination with a lower total energy in the at least one periodic radiation combination corresponding to the type of the object, and cause a periodic radiation combination corresponding to a vehicle body portion with no persons in the at least two different vehicle body portions of the object to be a periodic radiation combination with a higher total energy in the at least one periodic radiation combination corresponding to the type of the object when the inspection mode of the object is a mode in which a person stays in the vehicle.

In some embodiments, the at least one radiation pulse includes at least one of a radiation pulse having at least one first radiation energy and a radiation pulse having at least one second radiation energy, each first radiation energy is lower than 1 MeV, and each second radiation energy is greater than 1 MeV.

In some embodiments, the at least one second radiation energy includes two different radiation energies.

In some embodiments, the radiation source includes: an electronic beam generating device configured to generate electronic beams; a microwave generating device configured to generate a microwave; a microwave circulator having a power input port and at least two power output ports, the power input port being connected with the microwave generating device through a waveguide structure; accelerating tubes connected with the electronic beam generating device, respectively connected with the at least two power output ports, configured to respectively receive electronic beams generated by the electronic beam generating device, and accelerate electronic beams respectively through microwaves received from the at least two power output ports, to respectively generate radiation pulses having different radiation energies; and a controller in signal connection with the processor, the electronic beam generating device and the microwave generating device and configured to perform, according to instructions of the processor, chronological control on microwave power of the microwave generating device, and chronological control on beam loadings generated by the electronic beam generating device and respectively corresponding to electronic beams of accelerating tubes.

In some embodiments, the radiation source includes: a first electronic gun configured to generate a first electronic beam; a first electronic gun power source in signal connection with the controller and connected with the first electronic gun and configured to adjust a beam loading of the first electronic beam according to a chronological control signal provided by the controller; a second electronic gun configured to generate a second electronic beam; and a second electronic gun power source in signal connection with the controller and connected with the second electronic gun and configured to adjust a beam loading of the second electronic beam according to a chronological control signal provided by the controller, wherein the controller is configured to cause the first electronic gun power source to adjust the beam loading of the first electronic beam to be a first beam loading at a first time period in each period of at least one period, and cause the second electronic gun power source to adjust the beam loading of the second electronic beam to be a second beam loading at a second time period in each period, and the first time period does not coincide with the second time period.

In some embodiments, at least two power output ports of the microwave circulator include a first power output port and a second power output port, the first power output port is allocated with a microwave signal fed from the power input port, and the second power output port is allocated with a microwave signal fed from the first power output port; and accelerating tubes include: a first accelerating tube connected with the first power output port and the first electronic gun and configured to accelerate the first electronic beam through a first output microwave signal output by the first power output port; and a second accelerating tube connected with the second power output port and the second electronic gun and configured to accelerate the second electronic beam through a second output microwave signal output by the second power output port.

In some embodiments, at least two power output ports of the microwave circulator further include a third power output port which is allocated with a microwave signal fed from the second power output port; and the radiation source further includes: an absorbing load connected with the third power output port and configured to absorb a microwave signal output by the third power output port.

In some embodiments, the microwave circulator includes a four-port circulator.

In some embodiments, the controller is configured to allow a microwave signal fed by the microwave generating device to the power input port of the microwave circulator to include at least one first input microwave signal at the first time period, and to allow the microwave signal fed by the microwave generating device to the power input port of the microwave circulator to include at least one second input microwave signal at the second time period, and a power of the at least one first input microwave signal is greater than that of the at least one second input microwave signal.

In some embodiments, the microwave generating device includes a magnetron.

In some embodiments, the inspection system further includes: an optical sensing element in communication connection with the processor and configured to sense an object feature of the object and send the object feature of the object to the processor, and the processor determines the type of the object according to the object feature; or a human-machine interaction device in communication connection with the processor and configured to receive an input type information and send the input type information to the processor, and the processor determines the type of the object according to the type information.

In some embodiments, the detector is a dual-energy detector in communication connection with the processor, the dual-energy detector includes a high-energy detector array and a low-energy detector array, the low-energy detector array is configured to detect signals when the radiation pulses having the first radiation energy emitted by the radiation source act on the object, and the high-energy detector array is configured to detect signals when the radiation pulses having the second radiation energy emitted by the radiation source act on the object.

One aspect of the present disclosure provides an inspection method of the above inspection system, and the inspection method includes: obtaining a type of an inspected object; determining at least one periodic radiation combination corresponding to the type of the object according to the type of the object, wherein the periodic radiation combination is a chronological arrangement of at least one radiation pulse output by the radiation source in each scanning period; selecting periodic radiation combinations respectively corresponding to at least two different portions of the object in the at least one periodic radiation combination; causing the radiation source to emit radiation to the at least two corresponding different portions in selected periodic radiation combinations during the time that the object is scanned; and causing the detector to detect a signal when the radiation acts on the object.

In some embodiments, the inspection method further includes: obtaining an inspection mode of the object; wherein the step of selecting periodic radiation combinations respectively corresponding to at least two different portions of the object includes: selecting the periodic radiation combinations respectively corresponding to at least two different portions of the object in the at least one periodic radiation combination according to the type of the object and the inspection mode of the object.

In some embodiments, the step of obtaining a type of an inspected object includes: determining the type of the object according to an object feature in response to the object feature sensed by the optical sensing element; or determining the type of the object according to type information in response to the type information input to the human-machine interaction device.

Therefore, according to embodiments of the present disclosure, after the type of the object is obtained, a periodic radiation combination corresponding to the type is determined according to the type, and periodic radiation combinations respectively corresponding to different portions are selected, and during the time that the object is scanned, the radiation source emits radiation to different portions according to the selected periodic radiation combination, to scan different portions of objects of different types in certain scanning manners, and effectively improving adaptability of the inspection system on inspected objects.

BRIEF DESCRIPTION OF THE DRAWINGS

The accompanying drawings, which form part of the description, illustrate embodiments of the present disclosure and together with the description, serve to explain the principles of the present disclosure.

The present disclosure can be more clearly understood from the following detailed descriptions with reference to the accompanying drawings, in which.

It should be understood that the dimensions of various parts shown in the accompanying drawings are not drawn according to an actual scale relationship. In addition, the same or similar reference signs indicate the same or similar components.

DETAILED DESCRIPTION OF THE DISCLOSURE

Various exemplary embodiments of the present disclosure will now be described in detail with reference to the accompanying drawings. The descriptions of the exemplary embodiments are merely illustrative and are in no way intended to limit the present disclosure, and application or uses thereof. The present disclosure can be implemented in many different forms and is not limited to the embodiments described herein. These embodiments are provided, and the present disclosure will be thorough and complete, and will fully convey the scope of the present disclosure. It should be noted that unless otherwise specified, the relative arrangement of components and steps, the composition of materials, numerical expressions and numerical values set forth in these embodiments should be interpreted as merely illustrative and not as limitative.

Similar words of "first", "second" and the like used in the present disclosure do not indicate any order, quantity or importance, but are only used to distinguish different parts. Similar words such as "including" or "comprising" mean that the elements before the word cover the elements listed after the word, without excluding the possibility of covering other elements. "Upper", "lower", "left", "right" and the like are only used to indicate a relative positional relationship. After the absolute position of a described object changes, the relative positional relationship may also change accordingly.

In the present disclosure, when it is described that a specific device is located between a first device and a second device, there may be an intervening device between the specific device and the first device or the second device or not. When it is described that the specific device is connected to other devices, the specific device may be directly connected to the other devices without the intervening device, and may also have the intervening device without being directly connected to the other devices.

All terms (including technical terms or scientific terms) used in the present disclosure have the same meanings in the art to which the present disclosure belongs, unless otherwise defined particularly. It should also be understood that the terms defined in, for example, general dictionaries should be interpreted as having the meanings consistent with their meanings in the context of the related art, and should not be interpreted in an idealized or extremely formal sense unless explicitly defined herein.

Technologies, methods and equipment known to art may not be discussed in detail, but the technologies, methods and equipment should be regarded as part of the description under appropriate circumstances.

Figure 1:
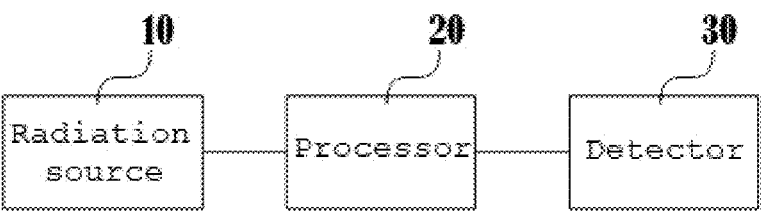
FIG. 1 is a structural schematic diagram according to some embodiments of an
    inspection system in the present disclosure.

FIG. 1 is a structural schematic diagram according to some embodiments of an inspection system in the present disclosure. Referring to FIG. 1, in some embodiments, the inspection system includes: a radiation source 10, a detector 30 and a processor 20. The inspection system herein is applicable to inspection of objects under application scenarios (e.g., vehicle inspection, ore grade inspection, food inspection, solid waste inspection and industrial inspection), such as vehicle inspection in the scenario of object inspection. The vehicle herein includes various types of motor vehicles (e.g., cars, buses, vans, container trucks) or trains (e.g., passenger trains or freight trains).

With vehicles as an example, during inspection, the vehicle can move relative to a radiation source. In some embodiments, the radiation source keeps stationary, and the inspected vehicle moves through its own power or is driven to move by other mechanisms. In some other embodiments, the inspected vehicle keeps stationary, and the radiation source moves through its own power or is driven to move by other mechanisms.

For a vehicle, according to different inspection modes, persons (the driver or the passengers) inside a vehicle can stay in the vehicle or leave the vehicle. For example, in one inspection mode, the driver parks the vehicle on a transmission device, and persons all leave the vehicle, the inspected vehicle is dragged through the transmission device to pass through the scanned area, and this mode is also called as a dragging mode. In this mode, the inspection system further includes a transmission device configured to transmit the inspected vehicle to pass through the scanned area. The dragging mode is one of the modes in which no person stays in the vehicle, the other mode in which no person stays in the vehicle is a mode in which the driver parks the vehicle in a predetermined scanned position of the inspection system, then persons all leave the vehicle, and the radiation source moves to achieve scanning the vehicle.

In another inspection mode, the driver directly drives a vehicle to pass through the scanned area, and this mode is also called a quick inspection mode. This mode is one of the modes in which a person stays in the vehicle. Persons inside a vehicle are not limited to drivers, and can also include passengers. The mode in which a person stays in the vehicle may also include a mode in which the vehicle is parked at a predetermined scanned position of the inspection system, none of persons leaves the vehicle, and the radiation source moves to achieve scanning the vehicle.

The radiation source 10 can generate radiation pulses having different radiation energies. Correspondingly, periodic radiation combinations can be achieved. In some embodiments, the radiation source 10 can include radiation sources, that is, in a form of sources, and each radiation source can respectively output radiation pulses having different energies. In some other embodiments, the radiation source 10 can include a single radiation source, that is, the ray source using the same microwave source (for example, the same magnetron). The single radiation source can output radiation pulses of different energies. The radiation pulse can be an X-ray pulse, and can also be a gamma-ray pulse, etc.

The detector 30 is configured to detect signals when the radiation emitted by the radiation source 10 acts on the inspected object. In some embodiments, the detector 30 can be arranged on an opposite side of the radiation source 10. For example, when the radiation source 10 emits an X-ray pulse, the X-ray is attenuated after penetrating through the inspected object and is detected by the detector 30 located on the other side, to form a detection signal. An image reflecting contents inside the object can be drawn according to the detection signal.

The processor 20 is in communication connection with the radiation source 10, and is configured to determine at least one periodic radiation combination corresponding to a type of the object according to the type of the object, select periodic radiation combinations respectively corresponding to at least two different portions of the object in the at least one periodic radiation combination, and cause the radiation source 10 to emit radiation to the at least two corresponding different portions in selected periodic radiation combinations during the time that the object is scanned. The periodic radiation combination herein is a chronological arrangement of at least one radiation pulse output by the radiation source 10 in each scanning period.

In some embodiments, the radiation source 10 outputs one radiation pulse in each scanning period. In some other embodiments, the radiation source 10 outputs radiation pulses in each scanning period, and radiation pulses have at least two different radiation energies.

Before detecting the object, the processor can receive the type of the object manually input by an operator, and can also cooperate with other elements to obtain related information of the object, to determine the type of the object. Different object types have different features, and have different requirements on multiple factors such as mass thickness, type of goods, acceptable radiation dose and desired imaging effect. With vehicles as an example, the type of the object may include a passenger car, a bus, a van, a container truck, a passenger train, a freight train, and may also include an object type distinguished by carried objects, e.g., a passenger car, an agricultural truck, and a fuel truck.

According to features of object types, different object types may correspond to one or more different periodic radiation combinations. For example, for different object types, the scanning periods of the corresponding periodic radiation combinations are different or the numbers or energies of radiation pulses included by corresponding periodic radiation combinations are different. For example, for some certain types of objects, more radiation pulses having a lower radiation energy and fewer radiation pulses having a higher radiation energy can be arranged within each period, or radiation pulses having a higher radiation energy can be not arranged within each period, to improve radiation safety, reduce unnecessary energy loss, and reduce spacing of each scanned cross section in one period, to obtain richer information of the inspected object, and cause no greater pressure to radiation protection. In some other embodiments, at least one periodic radiation combination corresponding to different types of objects can also be partially or completely the same.

For some other types of objects, in order that radiation effectively penetrates through objects, more radiation pulses having a higher radiation energy and fewer radiation pulses having a lower radiation energy can be arranged within each period, or radiation pulses having a lower radiation energy can be not arranged within each period, to improve scanning effect and imaging effect. Alternatively, to further improve the scanning effect, radiation pulses having more than two different higher radiation energies can be arranged, to enhance capability in recognizing substances.

For different portions of an object, periodic radiation combinations respectively corresponding to different portions can be further selected from one or more periodic radiation combinations corresponding to the object type. In some embodiments, at least two different portions are not overlapped in space (e.g., the head of a vehicle and the trailed container of the vehicle on the rear side of the head), have different acceptable radiation dose (e.g., a cab with persons in the vehicle and containers filled with goods in the vehicle), or have different mass thicknesses (e.g., areas accommodating containers with different mass thicknesses in a vehicle).

A certain object type can correspond to two different periodic radiation combinations, with an object containing a person as an example, the periodic radiation combination including radiation pulse having a lower energy scans the portion where persons are located, to reduce radiation dose received by persons, and the periodic radiation combination including the radiation pulse having a higher energy scans the portion with no persons, to improve imaging effect. The radiation source is controlled to emit radiation through targeting at the type of the object and the portion of the object, to further improve control granularity and effectively improve applicability of the inspection system to the inspected object.

Figure 2:
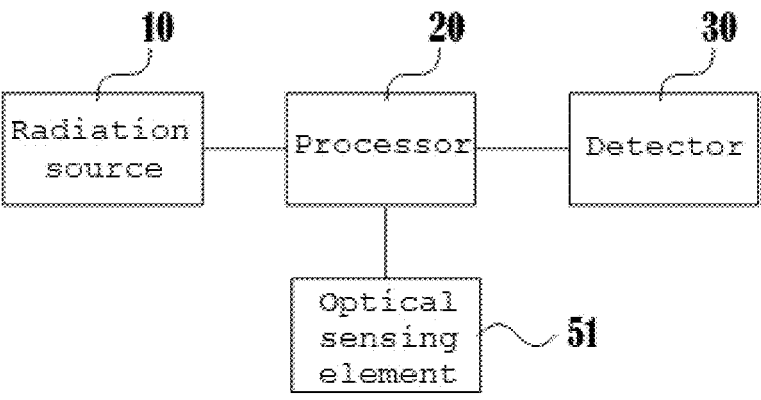
FIG. 2 is a structural schematic diagram according to some other embodiments of an inspection system of the present disclosure.

FIG. 2 is a structural schematic diagram according to some other embodiments of an inspection system of the present disclosure. Referring to FIG. 2, in some embodiments, the inspection system further includes an optical sensing element 51 in communication connection with the processor 20. The optical sensing element 51 is configured to sense an object feature of the object and send the object feature of the object to the processor 20, and the processor 20 determines the type of the object according to the object feature. The optical sensing element 51 can include a camera based on visible light, a photoelectric switch, a laser sensor, an infrared detector and a light curtain sensor. For example, when the inspected object is a vehicle, the object features can include vehicle contour features, specific markings of vehicle, signals emitted by a device mounted or carried on the vehicle for identifying the type, etc. In some embodiments, the optical sensing element 51 can also be used to detect the body of a vehicle, and the processor 20 can determine relative positions of the object and the scanned area.

Figure 3:
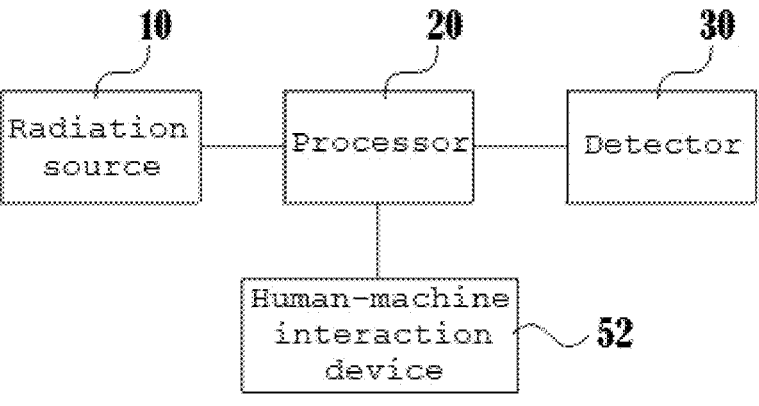
FIG. 3 is a structural schematic diagram according to still some embodiments of an inspection system of the present disclosure.

FIG. 3 is a structural schematic diagram according to still some embodiments of an inspection system of the present disclosure. Referring to FIG. 3, in some embodiments, the inspection system further includes a human-machine interaction device 52 in communication connection with the processor 20. The human-machine interaction device 52 is configured to receive an input type information and send the input type information to the processor 20, and the processor 20 determines the type of the object according to the type information. The human-machine interaction device 52 can include a mouse, a keyboard, a touch screen, a remote control, etc.

In some other embodiments, the inspection system can not only include an optical sensing element 51, but also include a human-machine interaction device 52, and the system can optionally receive information provided by the optical sensing element 51 and/or the human-machine interaction device 52, to determine the type of the object. Moreover, after determining the type of the object, the vehicle body of an object can be detected through the optical sensing element 51, and the processor 20 determines the relative positions of the object and the scanned area.

At least one radiation pulse realizable by the radiation source includes at least one of the radiation pulses having at least one first radiation energy and the radiation pulses having at least one second radiation energy. In other words, a certain periodic radiation combination may include radiation pulses having one or more first radiation energies, radiation pulses having one or more second radiation energies, or both radiation pulses having one or more first radiation energies and radiation pulses having one or more second radiation energies.

In some embodiments, the first radiation energy can be lower than 1 MeV, for example, 225 keV, 300 keV, 450 keV, etc. The second radiation energy is greater than 1 MeV, for example, 3 MeV, 4 MeV, 6 MeV, etc. In some embodiments, at least one second radiation energy includes two different radiation energies. For example, two types of second radiation energies can be 3 MeV and 6 MeV, 4 MeV and 6 MeV, 4 MeV and 7 MeV, or 6 MeV and 9 MeV. The ray pulses having different radiation energies can serve as backup rays for improving penetrating power under different mass thickness conditions.

For the portions with a higher mass thickness in the inspected object, richer classified information can be obtained through alternate scanning of two second radiation pulses, for example, a classification of organic substances, inorganic substances and mixtures can be obtained through alternate scanning of a radiation pulse of 3 MeV and a radiation pulse of 6 MeV, or a classification of organic substances, inorganic substances, mixtures and heavy metals can be obtained through alternate scanning of a radiation pulse of 6 MeV and a radiation pulse of 9 MeV. Correspondingly, different numbers of radiation pulses having the first type of second radiation energy and radiation pulses having the second type of second radiation energy can be set in the periodic radiation combination, to implement scanning requirements of different types of objects.

In the above embodiments, the processor 20 is configured to determine an inspection mode of the object, and selection is also made according to the inspection mode of the object when the periodic radiation combinations respectively corresponding to the at least two different portions of the object are selected. In other words, after the inspection mode of the object is obtained, the periodic radiation combinations respectively corresponding to the at least two different portions of the object are selected in the at least one periodic radiation combination according to the type of the object and the inspection mode of the object.

FIG. 4 to FIG. 9 are schematic diagrams of periodic radiation combinations adopted by a radiation source according to some embodiments of the inspection system of the present disclosure targeting at different types of vehicles under a mode in which no person stays in a vehicle. Referring to FIG. 4 to FIG. 9, in some embodiments, the object is a vehicle, and the processor 20 is configured to cause periodic radiation combinations respectively corresponding to at least two different vehicle body portions of the object to be a periodic radiation combination with the highest total energy in the at least one periodic radiation combination corresponding to the type of the object when the inspection mode of the object is a mode in which no person stays in the vehicle.

Figure 4:
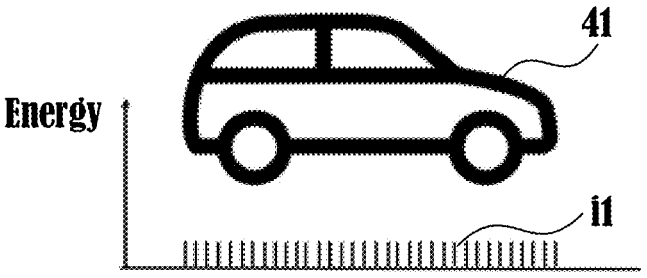
FIG. 4 to FIG. 9 are schematic diagrams of periodic radiation combinations adopted by a radiation source according to some embodiments of the inspection system of the present disclosure targeting at different types of vehicles under a mode in which no person stays in a vehicle.

In FIG. 4, each vehicle body portion of this type of vehicle, a passenger car 41, has a smaller mass thickness and fewer loaded goods, therefore, the passenger car 41 can be caused to match with a periodic radiation combination including at least one radiation pulse i1 having the first radiation energy in each inspection period. When the inspection mode is determined to be a mode in which no person stays in the vehicle, the radiation source can be caused to scan the whole vehicle according to the periodic radiation combination, that is, the periodic radiation combination can be adopted to scan each vehicle body portion of the passenger car 41.

Figure 5:
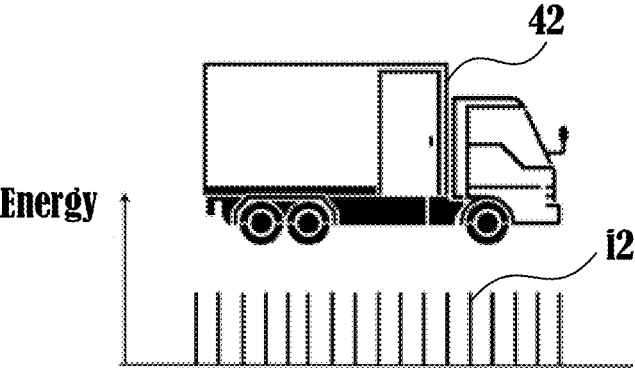

In FIG. 5, each vehicle body portion of this type of vehicle, a van 42, has a general mass thickness and generally carries a certain amount of goods, therefore, the van 42 can be caused to match with the periodic radiation combination including at least one radiation pulse i2 having the second radiation energy in each inspection period. When the inspection mode is determined to be a mode in which no person stays in the vehicle, the radiation source can be caused to scan the whole vehicle according to the periodic radiation combination, that is, the periodic radiation combination is adopted to scan each vehicle body portion of the van 41. Such periodic radiation combination can also be applied to medium or large-sized passenger cars.

Figure 6:
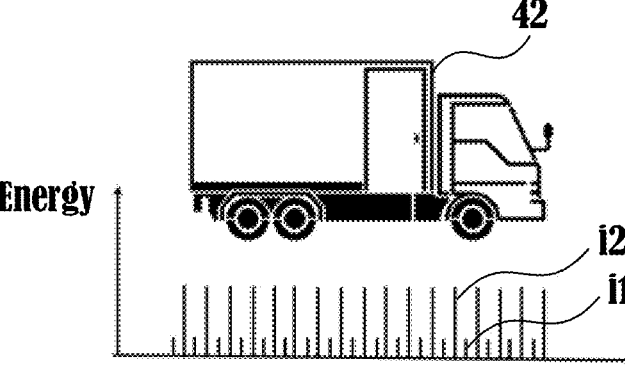

In addition to the periodic radiation combination as shown in FIG. 5, the periodic radiation combination as shown in FIG. 6 can also be adopted. In FIG. 6, the periodic radiation combination includes at least one radiation pulse i1 having the first radiation energy and at least one radiation pulse i2 having the second radiation energy in each inspection period.

Figure 7:
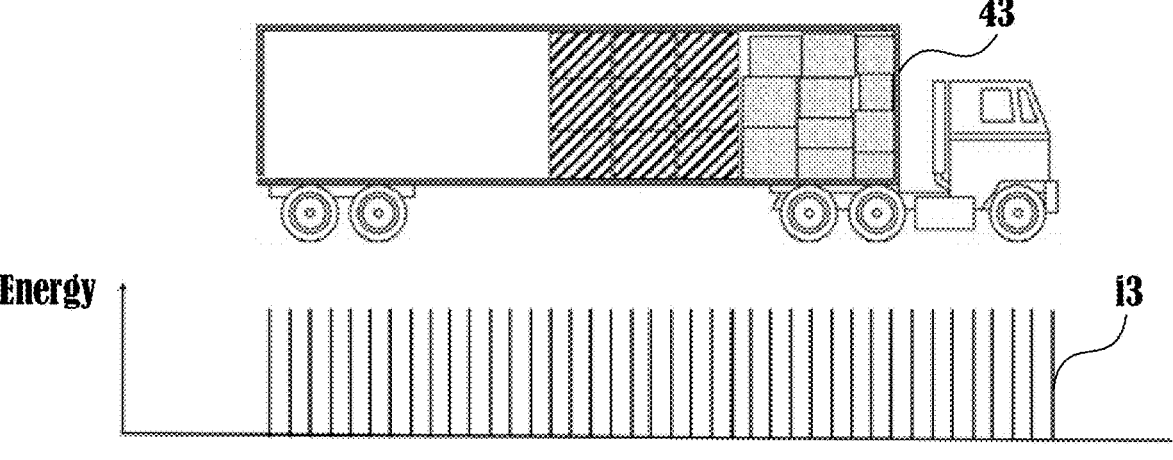
Figure 8:
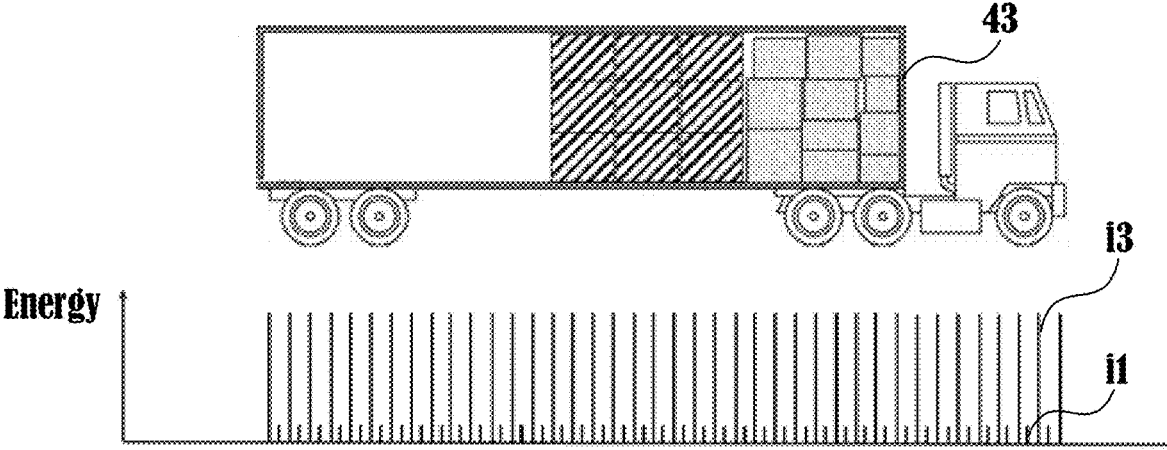
Figure 9:
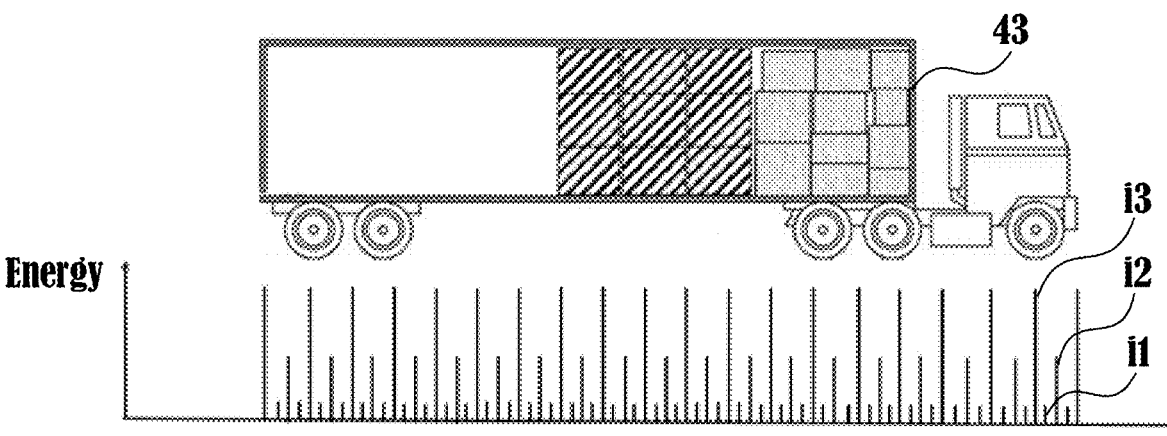

Referring to FIG. 7 to FIG. 9, for the container truck 43, the mass thickness of each vehicle body portion of the vehicle is larger, and the amount of loaded goods is larger, therefore, the container truck 43 can be caused to match with a periodic radiation combination including at least one radiation pulse having the second radiation energy in each inspection period. The radiation pulse having the first radiation energy can also be added to the periodic radiation combination as required, or the periodic radiation combination includes radiation pulses having more than two different second radiation energies in each inspection period.

The periodic radiation combination corresponding to the type of the container truck 43 may adopt any one in FIG. 7 to FIG. 9. In FIG. 7, the periodic radiation combination includes at least one radiation pulse i3 having the second radiation energy in each inspection period. In FIG. 8, the periodic radiation combination includes at least one radiation pulse i1 having the first radiation energy and at least one radiation pulse i3 having the second radiation energy in each inspection period. In FIG. 9, the periodic radiation combination includes at least one radiation pulse i1 having the first radiation energy and radiation pulses i2 and radiation pulses i3 having two different second radiation energies in each inspection period, and the second radiation energy of the radiation pulse i3 is greater than the second radiation energy of the radiation pulse 12. Through including the radiation pulse i1 in the inspection period, the spacing of each scanned cross section is reduced, to obtain richer information of the inspected object. These periodic radiation combinations may also be applicable to other large-sized trucks.

FIG. 10 to FIG. 14 are schematic diagrams of periodic radiation combinations adopted by the radiation source according to some embodiments of the inspection system of the present disclosure targeting at different types of vehicles under a mode in which a person stays in a vehicle. Referring to FIG. 10 to FIG. 14, in some embodiments, the object is a vehicle, the processor 20 is configured to cause the periodic radiation combination corresponding to the vehicle body portion with a person in at least two different vehicle body portions of the object to be a periodic radiation combination with a lower total energy in the at least one periodic radiation combination corresponding to the type of the object, and cause a periodic radiation combination corresponding to a vehicle body portion with no persons in at least two different vehicle body portions of the object to be a periodic radiation combination with a higher total energy in the at least one periodic radiation combination corresponding to the type of the object.

In a mode in which a person stays in the vehicle, in consideration of safety requirement on radiation dose acceptable by human bodies and policies of different countries and regions, when a vehicle is scanned, the vehicle body portion with a person can be scanned with a lower radiation energy or not scanned.

Figure 10:
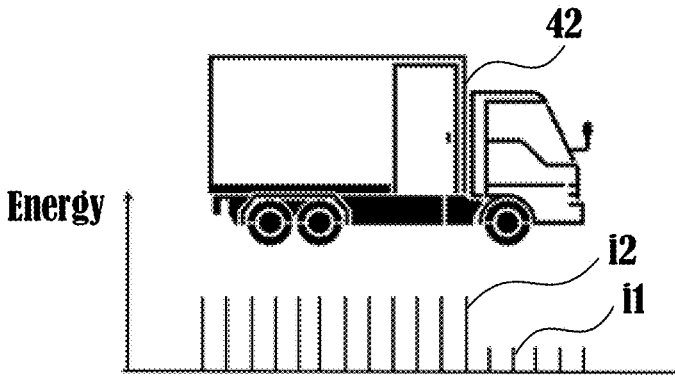
FIG. 10 to FIG. 14 are schematic diagrams of periodic radiation combinations adopted by the radiation source according to some embodiments of the inspection system of the present disclosure targeting at different types of vehicles under a mode in which a person stays in a vehicle.

In FIG. 10, for the cab of the van 42, a periodic radiation combination including at least one radiation pulse i1 having the first radiation energy is adopted in each inspection period, while the container portion of the van 42 adopts a periodic radiation combination including at least one radiation pulse i2 having the second radiation energy in each inspection period. Under this condition, radiation dose accumulated into the body of the driver in the cab in the inspection process is at a level acceptable by human bodies, and will not harm human health, moreover, imaging of the cab can be realized in a quick inspection process, and the vehicle can be inspected more comprehensively.

Figure 11:
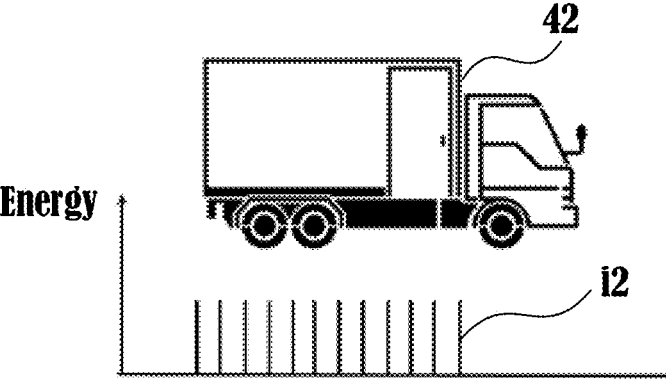

In FIG. 11, the cab of the van 42 can adopt a non-scanning mode, that is, the radiation source does not emit beams when the cab passes through the scanned range. For the container portion of the van 42, a periodic radiation combination including at least one radiation pulse i2 having the second radiation energy in each inspection period is adopted.

Figure 12:
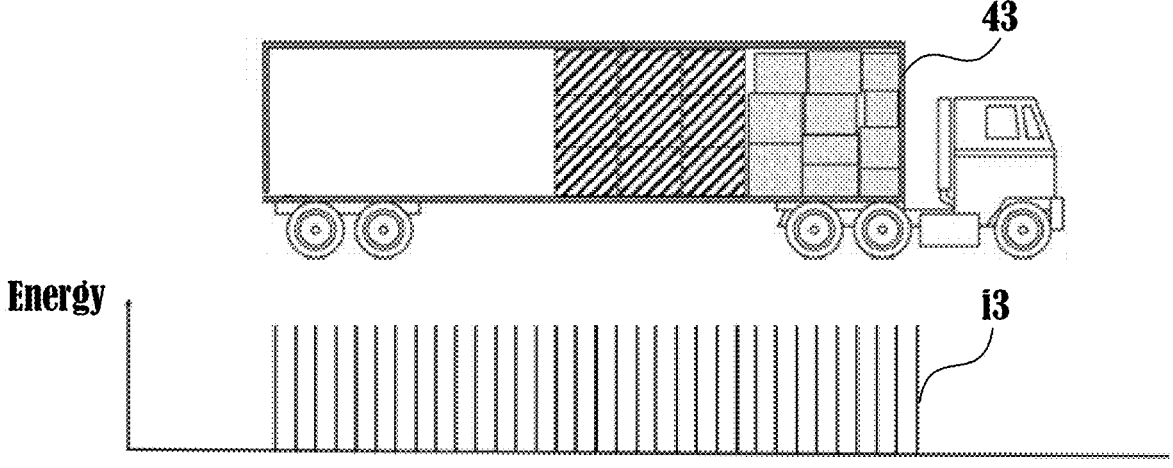
Figure 13:
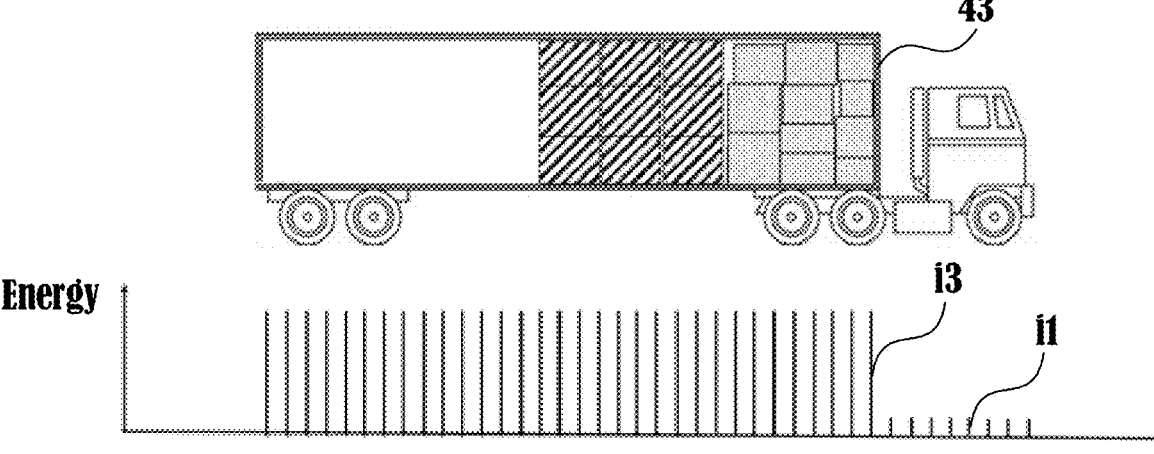

In FIG. 12 and FIG. 13, for the cab of the container truck 43, a non-scanning mode and a periodic radiation combination including at least one radiation pulse i1 having the first radiation energy in each inspection period are respectively adopted. The container trailed by the container truck matches with the periodic radiation combination including at least one radiation pulse i3 having the second radiation energy in each inspection period. The second radiation energy of the radiation pulse i3 is greater than the second radiation energy of the radiation pulse 12 corresponding to the container portion of the van 42.

Figure 14:
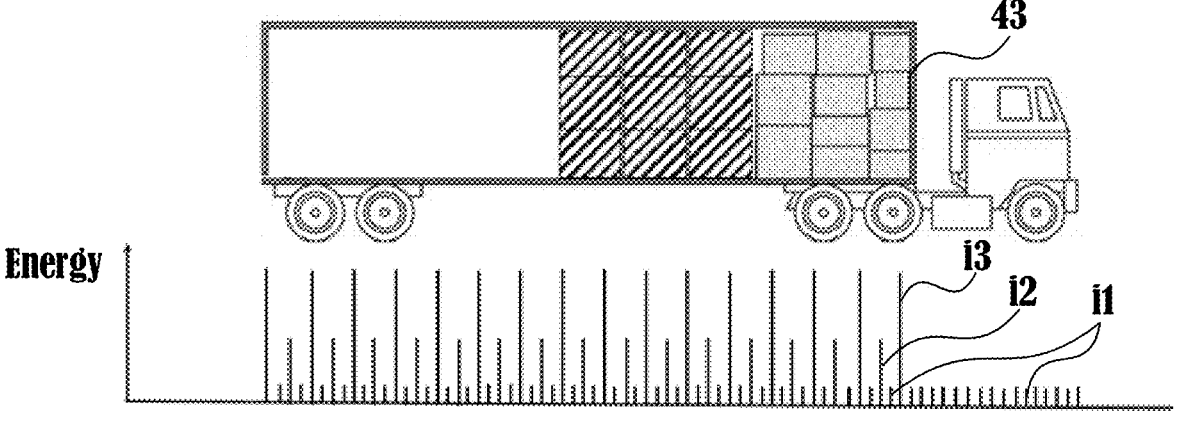

To obtain richer classified information when containers of the container truck 43 are scanned, in FIG. 14, the periodic radiation combination in each inspection period includes at least one radiation pulse i1 having the first radiation energy, and two radiation pulses i2 and radiation pulses i3 having different second radiation energies, and the second radiation energy of the radiation pulse i3 is greater than the second radiation energy of the radiation pulse i2.

Figure 15:
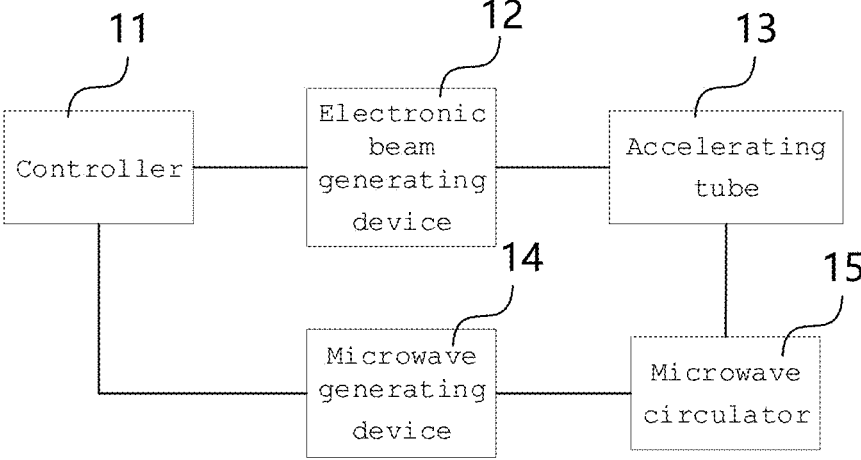
FIG. 15 is a structure diagram of a radiation source in some embodiments according to an inspection system of the present disclosure.

FIG. 15 is a structure diagram of a radiation source in some embodiments according to an inspection system of the present disclosure. Referring to FIG. 15, in some embodiments, the radiation source 10 includes: an electronic beam generating device 12, a microwave generating device 14, a microwave circulator 15, accelerating tubes 13, and a controller 11. The electronic beam generating device 12 is configured to generate electronic beams. In some embodiments, the electronic beam generating device 12 may cause electronic guns to generate electronic beams with the same or different beam loadings, respectively, by means of different high voltage amplitudes generated by a pulse modulator.

The microwave generating device 14 is configured to generate microwaves. In some embodiments, the microwave generating device 14 may generate varying operating currents by means of voltage of different amplitudes output from the pulse modulator, to generate microwave signals of different power. In some other embodiments, the microwave generating device 14 may also generate microwave signals of different power through variations of the magnetic field intensity. The microwave generating device 14 includes a magnetron 141.

The microwave circulator 15 has a power input port and at least two power output ports, and the power input port is connected to the microwave generating device 14 through a waveguide structure. The microwave circulator 15 has isolation characteristics and power allocation characteristics, and can transmit microwave energies along a single direction. By connecting the single microwave generating device 14 to the power input port of the microwave circulator 15, microwave energies fed from the power input port can be allocated to a specific power output port, and reflected microwave energies received by that power output port can be allocated to another power output port. By utilizing such characteristic of the microwave circulator 15 in conjunction with the chronological control of the microwave generating device 14, it is possible to achieve microwave energy output of more than two ports through the microwave generating device 14 as a single microwave power source.

Accelerating tubes 13 are connected to the electronic beam generating device 12, and connected to the at least two power output ports, respectively. Accelerating tubes 13 can receive electronic beams generated by the electronic beam generating device 12, respectively, and accelerate electronic beams respectively through the microwaves received from the at least two power output ports, to generate rays having different energies, respectively. The accelerated electronic beams may generate rays, such as X-rays, by bombarding a target.

The controller 11 is in signal connection with the electronic beam generating device 12 and the microwave generating device 14, and is configured to perform chronological control on microwave power of the microwave generating device 14, and chronological control on beam loadings of the electronic beams generated by the electronic beam generating device 12 and respectively corresponding to accelerating tubes 13. Through the chronological control performed by the controller 11 on the microwave generating device 14 and the electronic beam generating device 12, accelerating tubes 13 can respectively generate rays of different energies through a microwave power source, to implement the inspection needs of multi-energy spectrum coverage of an object, and improving the wire resolution indexes of the system while ensuring the penetrability.

Figure 16:
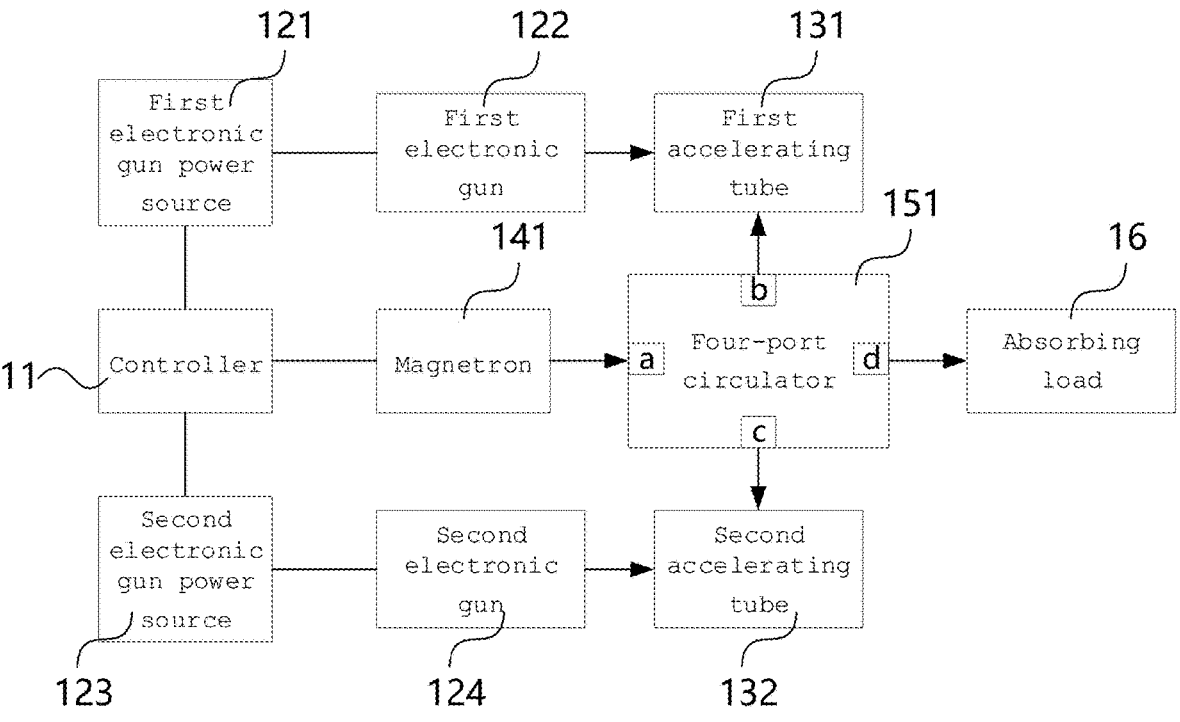
FIG. 16 is a structure diagram of a radiation source in some other embodiments according to an inspection system of the present disclosure.
Figure 17:
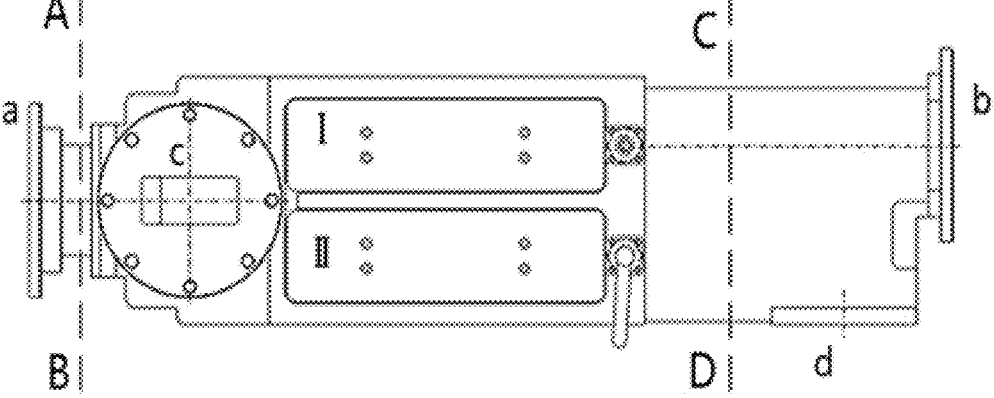
FIG. 17 is a structure diagram of a four-port circulator in some embodiments according to an inspection system of the present disclosure.

FIG. 16 is a structure diagram of a radiation source in some other embodiments according to an inspection system of the present disclosure. FIG. 17 is a structure diagram of a four-port circulator in some embodiments according to an inspection system of the present disclosure. Referring to FIG. 16, in some embodiments, the electronic beam generating device 2 includes a first electronic gun 122, a first electronic gun power source 121, a second electronic gun 124, and a second electronic gun power source 123. The first electronic gun 122 is configured to generate a first electronic beam. The second electronic gun 124 is configured to generate a second electronic beam. Each electronic gun power source and the microwave generating device may be powered by the same AC power source (e.g., 380V).

The first electronic gun power source 121 is in signal connection with the controller 11 and connected to the first electronic gun 122, and is configured to adjust the beam loading of the first electronic beam according to a chronological control signal provided by the controller 11. The second electronic gun power source 123 is in signal connection with the controller 11 and connected to the second electronic gun 124, and is configured to adjust the beam loading of the second electronic beam according to a chronological control signal provided by the controller 11. The controller 11 may adjust voltages applied to the electronic guns by sending a chronological control signal (e.g., pulse width modulation signal) to the electronic gun power sources to further adjust the beam loadings of the electronic beams.

Referring to FIG. 16 and FIG. 17, in some embodiments, at least two power output ports of the microwave circulator 15 include a first power output port b and a second power output port c, the first power output port b is allocated with a microwave signal fed from the power input port a, and the second power output port c is allocated with a microwave signal fed from the first power output port b. The microwave signal fed from the first power output port b may be a reflected microwave signal that is reflected back after being output from the first power output port b.

In FIG. 16, accelerating tubes 13 include a first accelerating tube 131 and a second accelerating tube 132. The first accelerating tube 131 is connected to the first power output port b and the first electronic gun 122, and is configured to accelerate the first electronic beam through a first output microwave signal output by the first power output port b. The second accelerating tube 132 is connected to the second power output port c and the second electronic gun 124, and is configured to accelerate the second electronic beam through a second output microwave signal output by the second power output port c. The accelerated first and second electronic beams may generate X-rays of different energies by bombarding a target.

In some other embodiments, the electronic beam generating device may include more than three electronic guns and corresponding electronic gun power sources thereof, and the ray generating device includes more than three accelerating tubes. Accordingly, the accelerating tubes are connected to more than three power output ports of the microwave circulator, respectively, to realize output of more types of ray energies through the chronological control of the controller and implement the multi-energy spectrum inspection requirements and multi-viewpoint scanning requirements to the objects.

Referring to FIG. 16, in some embodiments, at least two power output ports of the microwave circulator 15 further include a third power output port d. The third power output port d is allocated with a microwave signal fed from the second power output port c. The microwave signal fed from the second power output port c may be a reflected microwave signal that is reflected back after being output from the second power output port c. The ray generating device may further include an absorbing load 6 connected to the third power output port d. The absorbing load can absorb the microwave signal output from the third power output port d to realize an isolation effect to prevent the microwave signal from returning to the power input port of the microwave circulator.

Referring to FIG. 17, in some embodiments, the microwave circulator 15 includes a four-port circulator 151. The four-port circulator 151 has four ports, which are a power input port a, a first power output port b, a second power output port c and a third power output port d in the power transmission sequence, respectively, that is, the power transmission rule of the four-port circulator 151 is a→b→c→d. In some other embodiments, the microwave circulator 15 may further include a combination structure of three-port circulators and four-port circulators connected in series.

FIG. 17 illustrates the structure of a ferrite four-port circulator. The four-port circulator is a coupled device including a dual-T joint, a nonreciprocal phase shifter based on ferrite field-displacement effect, and a 3 dB coupler. During the operation of the ray generating device, an electromagnetic wave of which the amplitude is $E_0$ is fed from the power input port a. Due to the dual-T (H branch) characteristic, electromagnetic waves with equal amplitude of $E_0/(2^{(1/2)})$ and equal phase will be output from waveguides I and II at side A-B. The nonreciprocal phase shifter can allow phase of the electromagnetic wave in the waveguide I to be 90° ahead relative to that in the waveguide II when the electromagnetic wave is forwardly transmitted from side A-B to side C-D (and conversely, the phase in the waveguide II is 90° ahead relative to the phase in the waveguide I if it is reversely transmitted from side C-D to side A-B), and the 3 dB coupler from side C-D to a location between the first power output port b and the third power output port d can cause the microwave power in the waveguides I and II to be equally divided to the first power output port b and the third power output port d, respectively, but the phase shift is increased by 90° during the coupling transmission, and all microwave power output from the waveguide I and the waveguide II to the first power output port b and the third power output port d, respectively, is output from the first power output port b, but is not output at the third power output port d.

Similarly, the microwave power input from the first power output port b is allocated to the second power output port c for output, and the microwave power input from the second power output port c is allocated to the third power output port d for output. Accordingly, the reflected microwave input from the first power output port b is allocated to the second power output port c for output, and the reflected wave from the second power output port c will be transmitted to the third power output port d and absorbed by the absorbing load.

In some embodiments, the chronological control by the controller 11 causes the first accelerating tube connected to the first power output port b to obtain larger power and energy to output at least one type of X-rays with a higher energy, for example, X-rays with output energies of 6 MeV and 3 MeV; and the chronological control by the controller 11 causes the second accelerating tube connected to the second power output port c to obtain smaller power and energy to output at least one type of X-rays with a lower energy, such as X-rays with output energies of 0.3 to 0.6 MeV. In this way, the effect of power allocation is achieved by differences of the microwave power output from different power output ports of the microwave circulator, and accelerating tubes with different energies can be driven by utilizing the power allocation characteristic of the microwave circulator, to implement various inspection requirements.

In the above embodiments of the inspection system, the detector 30 can be a dual-energy detector. The dual-energy detector includes a high-energy detector array and a low-energy detector array. The low-energy detector array is configured to detect a signal when the radiation pulses having the first radiation energy emitted by the radiation source acts on the object. The high-energy detector array is configured to detect a signal when the radiation pulses having the second radiation energy emitted by the radiation source 10 acts on the object. The high-energy detector array and the low-energy detector array are turned on alternately within a scanning period, when the radiation source emits the radiation pulse having the first radiation energy, the low-energy detector array is turned on, and the high-energy detector array is turned off, while when the radiation source emits the radiation pulse having the second radiation energy, the high-energy detector array is turned on, and the low-energy detector array is turned off, to effectively prevent or reduce interference of the detector 30 on the reception of detection signals when the radiation pulses of different radiation energies act on inspected objects, and improving quality of the obtained scanned images.

Figure 18:
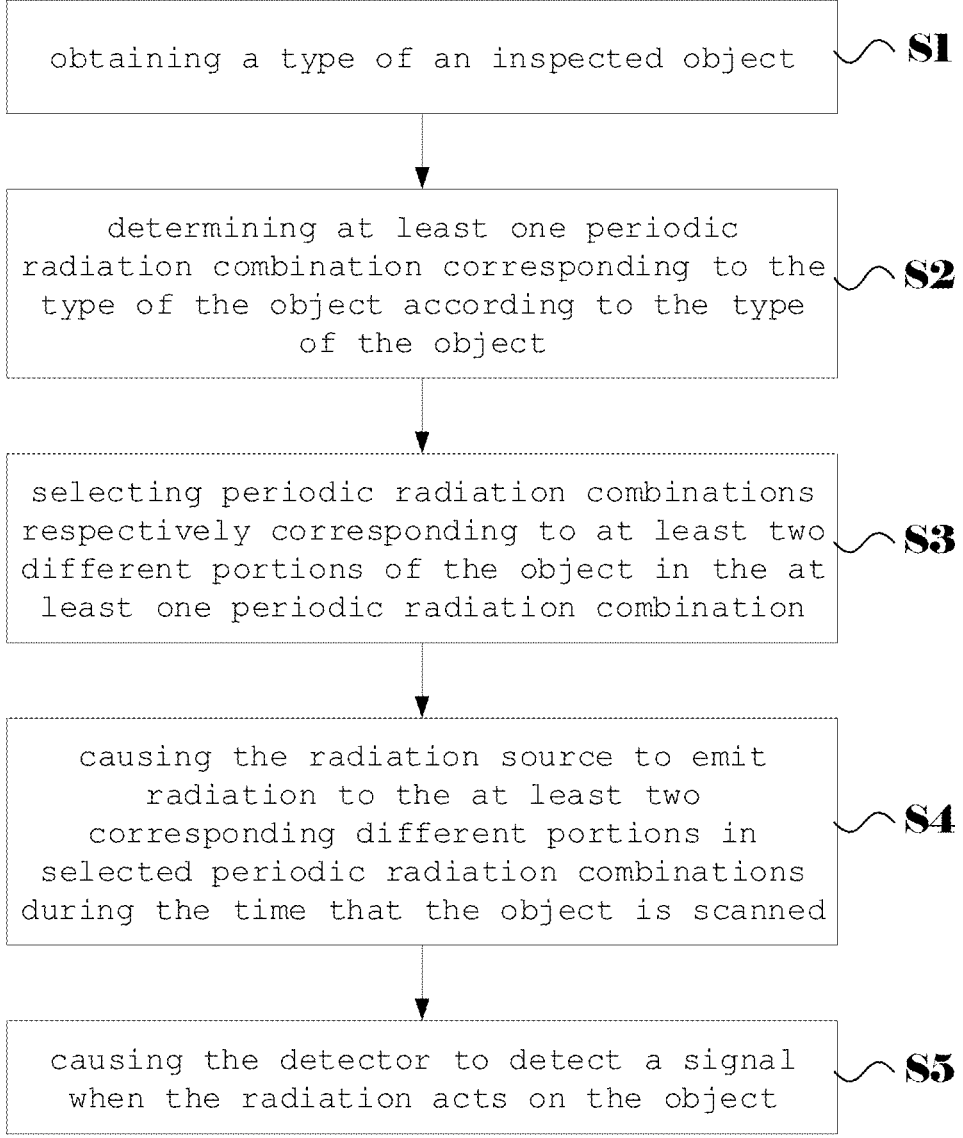
FIG. 18 is a schematic flowchart of some embodiments of the inspection method of the present disclosure.

Based on each embodiment of the above inspection system, the present disclosure further provides an embodiment of the inspection method. FIG. 18 is a schematic flowchart of some embodiments of the inspection method of the present disclosure. Referring to FIG. 18, in some embodiments, the inspection method of the above inspection system includes: step S1 to step S5. In the step S1, the type of the inspected object is obtained. In the step S2, at least one periodic radiation combination corresponding to the type of the object is determined according to the type of the object, wherein the periodic radiation combination is a chronological arrangement of at least one radiation pulse output by the radiation source 10 in each scanning period.

In the step S3, periodic radiation combinations respectively corresponding to at least two different portions of the object in the at least one periodic radiation combination are selected. In the step S4, the radiation source 10 is caused to emit radiation to the at least two corresponding different portions in selected periodic radiation combinations during the time that the object is scanned. In the step S5, the detector 30 is caused to detect a signal after radiation acts on the object.

In the present embodiment, after the type of the inspected object is obtained, the periodic radiation combination corresponding to the type is determined according to the type, and periodic radiation combinations respectively corresponding to different portions are selected, and during the time that the object is scanned, the radiation source emits radiation to different portions according to the selected periodic radiation combinations, to scan different portions of the objects of different types in specific scanning manners, and effectively improving applicability of the inspection system to the inspected object.

In some embodiments, the step of obtaining a type of an inspected object includes: determining the type of the object according to an object feature in response to the object feature sensed by the optical sensing element 51. In some other embodiments, the step of obtaining a type of an inspected object includes: determining the type of the object according to a type information in response to the type information input to the human-machine interaction device 52.

In some embodiments, the inspection method further includes: obtaining an inspection mode of the object; wherein the step of selecting periodic radiation combination respectively corresponding to at least two different portions of the object includes: selecting the periodic radiation combinations respectively corresponding to at least two different portions of the object in the at least one periodic radiation combination according to the type of the object and the inspection mode of the object.

Multiple embodiments in the present specification are described in a progressive manner, and each embodiment has different emphases, while the same or similar parts between each embodiment can be referred to each other. For method embodiments, since the whole and the steps involved are corresponding to the contents of the system embodiments, the description is relatively simple, and for related parts, please refer to part of the description of the system embodiments.

So far, various embodiments of the present disclosure have been described in detail. In order to avoid obscuring concepts of the present disclosure, some details that are well known in the art have not been described. How to implement the embodiments disclosed here according to the above descriptions.

Although some specific embodiments of the present disclosure have been described in detail through examples, it should be understood that the above examples are only for illustration and are not intended to limit the scope of the present disclosure. The above embodiments can be modified or some technical features can be replaced by equivalents without departing from the scope and spirit of the present disclosure. The scope of the present disclosure is defined by appended claims.

What is claimed is:

1. An inspection system, comprising:
a radiation source;
a detector configured to detect a signal when radiation emitted by the radiation source acts on the inspected object; and
a processor in communication connection with the radiation source and configured to determine at least one periodic radiation combination corresponding to a type of object, select periodic radiation combinations respectively corresponding to at least two different portions of the object in the at least one periodic radiation combination, and cause the radiation source to emit radiation to the at least two corresponding different portions in selected periodic radiation combinations during the time that the object is scanned,
wherein a periodic radiation combination is a chronological arrangement of at least one radiation pulse output by the radiation source in each scanning period.

2. The inspection system according to claim 1, wherein the at least two different portions are not overlapped in space, have different acceptable radiation doses, or have different mass thicknesses.

3. The inspection system according to claim 1, wherein the processor is configured to determine an inspection mode of the object, and selection is also made according to the inspection mode of the object while selecting the periodic radiation combinations respectively corresponding to the at least two different portions of the object.

4. The inspection system according to claim 3, wherein the object is a vehicle, and the processor is configured to cause periodic radiation combinations respectively corresponding to at least two different vehicle body portions of the object to be a periodic radiation combination with the highest total energy in the at least one periodic radiation combination corresponding to the type of the object when the inspection mode of the object is a mode in which no person stays in the vehicle.

5. The inspection system according to claim 3, wherein the object is a vehicle, the processor is configured to cause a periodic radiation combination corresponding to a portion with a person in the at least two different vehicle body portions of the object to be a periodic radiation combination with a lower total energy in the at least one periodic radiation combination corresponding to the type of the object, and cause a periodic radiation combination corresponding to a vehicle body portion with no persons in the at least two different vehicle body portions of the object to be a periodic radiation combination with a higher total energy in the at least one periodic radiation combination corresponding to the type of the object when the inspection mode of the object is a mode in which a person stays in the vehicle.

6. The inspection system according to claim 1, wherein the at least one radiation pulse comprises at least one of a radiation pulse having at least one first radiation energy and a radiation pulse having at least one second radiation energy, each first radiation energy is lower than 1 MeV, and each second radiation energy is greater than 1 MeV.

7. The inspection system according to claim 6, wherein the at least one second radiation energy comprises two different radiation energies.

8. The inspection system according to claim 6, wherein the radiation source comprises:

an electronic beam generating device configured to generate a plurality of electronic beams;

a microwave generating device configured to generate a microwave;

a microwave circulator having a power input port and at least two power output ports, the power input port being connected with the microwave generating device through a waveguide structure;

a plurality of accelerating tubes connected with the electronic beam generating device, respectively connected with the at least two power output ports, configured to respectively receive a plurality of electronic beams generated by the electronic beam generating device, and accelerate the plurality of electronic beams respectively through microwaves received from the at least two power output ports, so as to respectively generate a plurality of radiation pulses having different radiation energies; and a controller in signal connection with the processor, the electronic beam generating device and the microwave generating device and configured to perform, according to instructions of the processor, chronological control on microwave power of the microwave generating device, and chronological control on beam loadings generated by the electronic beam generating device and respectively corresponding to electronic beams of the plurality of accelerating tubes.

9. The inspection system according to claim 8, wherein the radiation source comprises:

a first electronic gun configured to generate a first electronic beam;

a first electronic gun power source in signal connection with the controller and connected with the first electronic gun and configured to adjust a beam loading of the first electronic beam according to a chronological control signal provided by the controller;

a second electronic gun configured to generate a second electronic beam; and a second electronic gun power source in signal connection with the controller and connected with the second electronic gun and configured to adjust a beam loading of the second electronic beam according to a chronological control signal provided by the controller, wherein the controller is configured to cause the first electronic gun power source to adjust the beam loading of the first electronic beam to be a first beam loading at a first time period in each period of at least one period, and cause the second electronic gun power source to adjust the beam loading of the second electronic beam to be a second beam loading at a second time period in each period, and the first time period does not coincide with the second time period.

10. The inspection system according to claim 9, wherein at least two power output ports of the microwave circulator comprise a first power output port and a second power output port, the first power output port is allocated with a microwave signal fed from the power input port, and the second power output port is allocated with a microwave signal fed from the first power output port; and the plurality of accelerating tubes comprise:

a first accelerating tube connected with the first power output port and the first electronic gun and configured to accelerate the first electronic beam through a first output microwave signal output by the first power output port; and a second accelerating tube connected with the second power output port and the second electronic gun and configured to accelerate the second electronic beam through a second output microwave signal output by the second power output port.

11. The inspection system according to claim 10, wherein at least two power output ports of the microwave circulator further comprise a third power output port which is allocated with a microwave signal fed from the second power output port; and the radiation source further comprises: an absorbing load connected with the third power output port and configured to absorb a microwave signal output by the third power output port.

12. The inspection system according to claim 11, wherein the microwave circulator comprises a four-port circulator.

13. The inspection system according to claim 11, wherein the controller is configured to allow a microwave signal fed by the microwave generating device to the power input port of the microwave circulator to comprise at least one first input microwave signal at the first time period, and to allow the microwave signal fed by the microwave generating device to the power input port of the microwave circulator to comprise at least one second input microwave signal at the second time period, and a power of the at least one first input microwave signal is greater than that of the at least one second input microwave signal.

14. The inspection system according to claim 8, wherein the microwave generating device comprises a magnetron.

15. The inspection system according to claim 1, further comprising:

an optical sensing element in communication connection with the processor and configured to sense an object feature of the object and send the object feature of the object to the processor, wherein the processor determines the type of the object according to the object feature; or a human-machine interaction device in communication connection with the processor and configured to receive an input type information and send the input type information to the processor, wherein the processor determines the type of the object according to the type information.

16. The inspection system according to claim 6, wherein the detector is a dual-energy detector in communication connection with the processor, the dual-energy detector comprises a high-energy detector array and a low-energy detector array, the low-energy detector array is configured to detect signals when the radiation pulses having the first radiation energy emitted by the radiation source act on the object, and the high-energy detector array is configured to detect signals when the radiation pulses having the second radiation energy emitted by the radiation source act on the object.

17. An inspection method of the inspection system according to claim 1, comprising:

obtaining a type of an inspected object;

determining at least one periodic radiation combination corresponding to the type of the object according to the type of the object, wherein the periodic radiation combination is a chronological arrangement of at least one radiation pulse output by the radiation source in each scanning period;

selecting periodic radiation combinations respectively corresponding to at least two different portions of the object in the at least one periodic radiation combination;

causing the radiation source to emit radiation to the at least two corresponding different portions in selected periodic radiation combinations during the time that the object is scanned; and causing the detector to detect a signal when the radiation acts on the object.

18. The inspection method according to claim 17, further comprising:

obtaining an inspection mode of the object;

wherein the step of selecting periodic radiation combinations respectively corresponding to at least two different portions of the object comprises:

selecting the periodic radiation combinations respectively corresponding to at least two different portions of the object in the at least one periodic radiation combination according to the type of the object and the inspection mode of the object.

19. The inspection method according to claim 17, wherein the step of obtaining a type of an inspected object comprises:

determining the type of the object according to an object feature in response to the object feature sensed by the optical sensing element; or determining the type of the object according to type information in response to the type information input to the human-machine interaction device.

\* \* \* \* \*